(12) United States Patent
Kohda

(10) Patent No.: US 6,624,437 B2
(45) Date of Patent: *Sep. 23, 2003

(54) RADIATION IMAGE INFORMATION READER

(75) Inventor: Katsuhiro Kohda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/910,869

(22) Filed: Jul. 24, 2001

(65) Prior Publication Data

US 2002/0014604 A1 Feb. 7, 2002

(30) Foreign Application Priority Data

Jul. 24, 2000 (JP) ........................................ 2000-221623

(51) Int. Cl.$^7$ .............................................. G03B 42/08
(52) U.S. Cl. ........................ 250/584; 250/586; 250/581
(58) Field of Search ................................ 250/581, 584, 250/585, 586, 587

(56) References Cited

U.S. PATENT DOCUMENTS

| | | | |
|---|---|---|---|
| 4,816,679 A | 3/1989 | Sunagawa et al. | 250/327.2 |
| 4,922,103 A | 5/1990 | Kawajiri et al. | 250/327.2 |
| 4,950,895 A * | 8/1990 | Reinfelder | 250/327.2 |
| 6,495,849 B2 * | 12/2002 | Yasuda | 250/584 |
| 2001/0011714 A1 * | 8/2001 | Yasuda | 250/589 |

FOREIGN PATENT DOCUMENTS

| | | | |
|---|---|---|---|
| JP | 60-111568 | 6/1985 | H04N/1/04 |
| JP | 60-236354 | 11/1985 | H04N/1/04 |
| JP | 1-101540 | 4/1989 | G03B/42/02 |

* cited by examiner

Primary Examiner—Constantine Hannaher
Assistant Examiner—Timothy Moran
(74) Attorney, Agent, or Firm—Sughrue Mion, PLLC

(57) ABSTRACT

Disclosed herein is a radiation image information reader for reading radiation image information from a stimulable phosphor sheet and obtaining an image signal which represents the radiation image information. The radiation image information reader comprises a horizontal scan section and a read section. The horizontal scan section is used for horizontally scanning a plurality of spot-sized excitation light beams simultaneously onto the phosphor sheet at predetermined intervals on a horizontal scanning line. The read section is used to obtain the image signal which represents the radiation image information by photoelectrically detecting photostimulated luminescent light beams, emitted from portions of the sheet irradiated with the excitation light beams and/or from portions on a bottom surface of the sheet which correspond to the irradiated portions, by horizontal scanning of the excitation light beams.

20 Claims, 14 Drawing Sheets

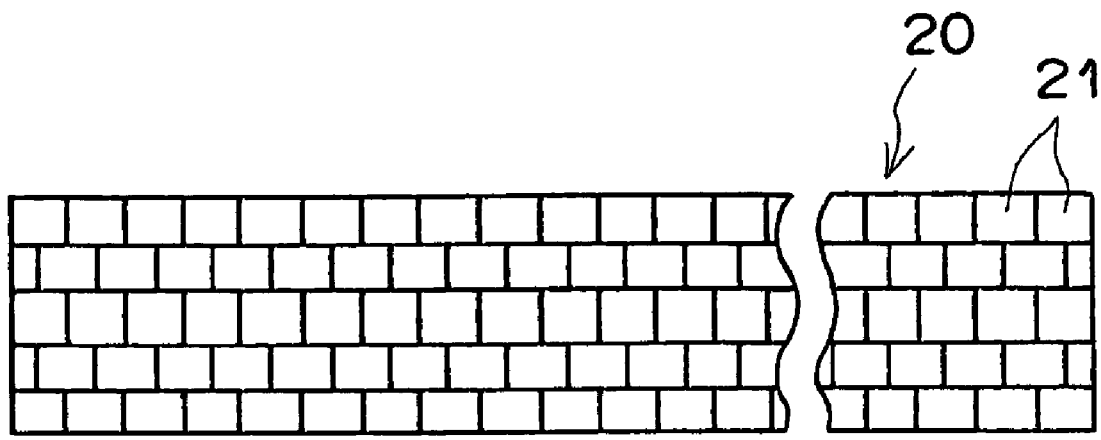

F I G. 3A
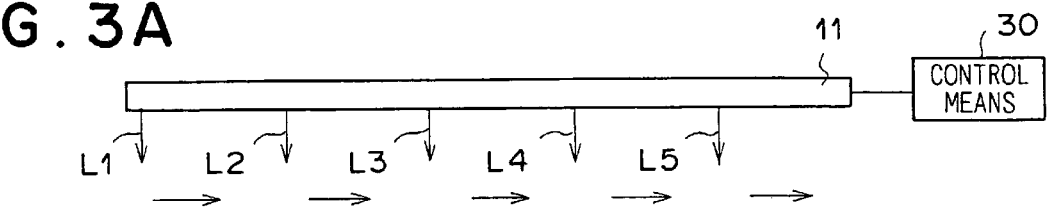
F I G. 3B
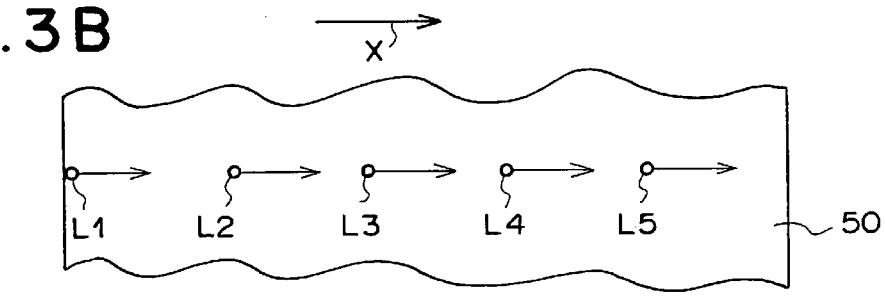
F I G. 3C
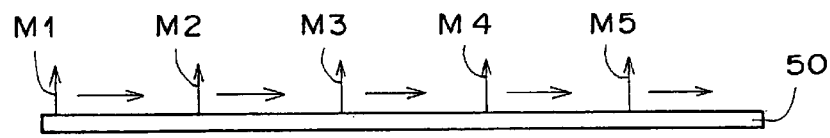
F I G. 3D
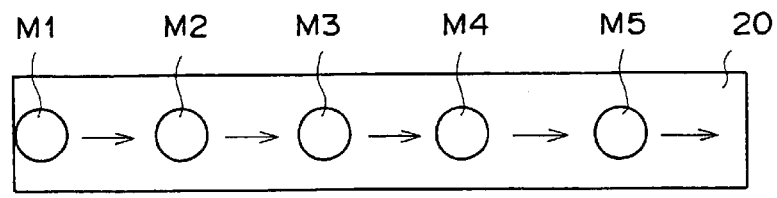

F I G . 4
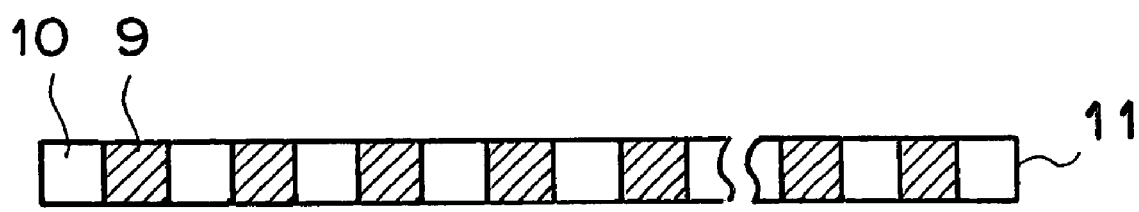

RADIATION IMAGE INFORMATION READER

BACKGROUND OF THE INVENTION

1. Field of the Invention

The present invention relates to a radiation image information reader, and more particularly to a radiation image information reader for photoelectrically reading photostimulated luminescent light emitted from a stimulable phosphor sheet.

2. Description of the Related Art

A stimulable phosphor stores part of radiation energy when exposed to radiation, and emits photostimulated luminescent light according to the stored energy when exposed to excitation light such as visible light, laser light, etc. This stimulable phosphor is stacked on a support body and utilized in a radiation image recording-reproducing system, which has extensively been put to practical use. In the radiation image recording-reproducing system, the radiation image information of a subject, such as a human body, etc., is temporarily recorded on the stimulable phosphor sheet. The stimulable phosphor sheet emits photostimulated luminescent light when scanned with excitation light such as laser light, etc. The photostimulated luminescent light is detected photoelectrically by image read means, and an image signal representing the radiation image information is obtained. After this image signal has been read, the stimulable phosphor sheet is irradiated with erasing light and emits the radiation energy remaining therein.

The image signal obtained by the aforementioned radiation image recording-reproducing system is subjected to image processing, such as a gradation process, a frequency process, etc., suitable for image observation and reading. After these processes, the processed image signal is recorded on film as a visible image for diagnosis, or displayed on a high-definition CRT display, so that it can be used for diagnosis. On the other to hand, if the aforementioned stimulable phosphor sheet is irradiated with erasing light to remove residual radiation energy, the sheet can be repeatedly used because it can store and record radiation image information again.

It is disclosed (in Japanese Unexamined Patent Publication Nos. 60(1985)-111568, 60(1985)-236354, 1(1989)-101540, etc.) that the radiation image information reader in the aforementioned radiation image recording-reproducing system employs a line light source and a line sensor in order to shorten the time needed to read photostimulated luminescent light, make the reader compact, and reduce costs. The line light source is used as an excitation light source for irradiating line excitation light to a phosphor sheet. The line sensor is used as photoelectric read means, which includes a large number of photoelectric conversion elements arrayed along the length direction of a line portion on the sheet irradiated with the excitation light by the line light source. Furthermore, the radiation image information reader is equipped with scan means for relatively moving the line light source and the line sensor with respect to the phosphor sheet in a direction substantially perpendicular to the length direction of the aforementioned light-irradiated line portion.

However, since photostimulated luminescent light spreads in all directions from a spot on the stimulable phosphor sheet irradiated with excitation light, the photostimulated luminescent light is detected not only by a photoelectric conversion element corresponding to the irradiated spot but by photoelectric conversion elements other than the corresponding photoelectric conversion element. Therefore, in the case where excitation light is irradiated to the stimulable phosphor sheet by the aforementioned line light source, and photostimulated luminescent light is detected by the line sensor, the beams of photostimulated luminescent light are mixed at the photoelectric conversion element of the line sensor and cause crosstalk. As a result, there is a problem that the sharpness of a radiation image obtained will be reduced. In this case, to avoid crosstalk, photostimulated luminescent light can be narrowed down so that it is detected only by a corresponding photoelectric conversion element. However, this causes another problem that photostimulated luminescent light cannot be efficiently collected.

SUMMARY OF THE INVENTION

The present invention has been made in view of the circumstances mentioned above. Accordingly, it is an object of the present invention to provide a radiation image information reader that is capable of shortening the time needed to read photostimulated luminescent light, as in the aforementioned radiation image information recording-reproducing system where line excitation light is irradiated onto a phosphor sheet by the line sensor. Another object of the invention is to provide a radiation image information reader which is capable of suppressing crosstalk.

To achieve the objects of the present invention mentioned above, there is provided a radiation image information reader for reading radiation image information from a stimulable phosphor sheet and obtaining an image signal which represents the radiation image information, the radiation image information reader comprising horizontal scan means and read means. The horizontal scan means is used for horizontally scanning a plurality of spot-sized excitation light beams simultaneously onto the phosphor sheet at predetermined intervals on a horizontal scanning line. The read means is used for obtaining the image signal which represents the radiation image information by photoelectrically detecting photostimulated luminescent light beams, emitted from portions of the sheet irradiated with the excitation light beams and/or from portions on a bottom surface of the sheet which correspond to the irradiated portions, by horizontal scanning of the excitation light beams.

An excitation light source that is employed in the horizontal scan means can use a light-emitting element array, a laser array, a combination of a plurality of laser light beams and deflection means for reflecting and deflecting these laser light beams, etc. The plurality of laser light beams may be emitted from a plurality of lasers, or may be obtained by emitting a single laser light beam from a single laser and then dividing the single laser light beam into a plurality of laser light beams with a beam splitter. The suitable linewidth of the excitation light beam on the sheet is 10 to 4000 μm. A suitable number of excitation light beams is from 2 to 100.

The predetermined interval is an interval such that a photostimulated luminescent light beam emitted by the irradiation of one excitation light beam onto the sheet does not mix with another photostimulated luminescent light beam emitted by another excitation light beam irradiated onto the sheet adjacent to the one excitation light beam.

In order to enhance the degree of convergence of the excitation light beam irradiated onto the sheet, it is desirable to dispose a cylindrical lens, a slit, a refractive index profile type lens array, a rod lens array, a fluorescent-light guiding sheet, optical fibers, etc., or a combination of them, between the light source and the sheet.

In the case where a light-emitting element array with a plurality of light-emitting elements disposed in a row is employed as the excitation light source, a portion joining light-emitting elements together or an electrode portion becomes a nonemission portion that emits no light. Therefore, in the case where the light-emitting element array is employed as the horizontal scan means, it is preferable to use a plurality of light-emitting element arrays. In the arrays, the nonemission portions in one light-emitting element array and the light-emitting elements in another light-emitting element array are complementarily disposed in the vertical scanning direction. Also, the light-emitting elements in the light-emitting element arrays are sequentially turned on alternately between the light-emitting element arrays so that light emitted from the light-emitting element arrays is scanned horizontally onto the phosphor sheet as a single excitation light beam.

The expression "complementarily disposed" means that one light-emitting element array and another light-emitting element array are disposed so that the nonemission portions in the one light-emitting element array and the light-emitting elements in the other light-emitting element array are aligned with one another in the vertical scanning direction and so that the light-emitting elements of the one array are not aligned with those of the other array In the radiation image information reader of the present invention, the read means may have a line sensor in which a plurality of photoelectric conversion elements are disposed in the horizontal scanning direction. Also, the read means may have an area sensor in which a plurality of photoelectric conversion elements are two-dimensionally disposed.

Furthermore, the read means may comprise light-collecting means having a plurality of separate portions which respectively collect the photostimulated luminescent light beams, and a plurality of photoelectric conversion means for respectively performing photoelectric conversion on the photostimulated luminescent light beams collected by the light-collecting means. When two photostimulated luminescent light beams emitted by irradiation of two excitation light beams are collected by one of the separate portions during horizontal scanning of the plurality of excitation light beams, the horizontal scanning is performed by turning off one of the two excitation light beams so that one of the two photostimulated luminescent light beams is turned off.

The line sensor can employ an amorphous silicon sensor, a charge-coupled device (CCD) sensor, a CCD with a back illuminator, a metal-oxide-semiconductor (MOS) image sensor, etc.

The line sensor may be constructed by disposing a plurality of photoelectric conversion elements in the vertical scanning direction. In this case, an array in which a plurality of photoelectric conversion elements are disposed is not limited to a matrix array in which conversion elements are disposed straight in both the longitudinal direction and the transverse direction. It may be an array in which conversion elements are disposed straight in the longitudinal direction and zigzag in the transverse direction, an array in which conversion elements are disposed straight in the transverse direction and zigzag in the longitudinal direction, or an array in which conversion elements are disposed zigzag in both the longitudinal direction and the transverse direction.

The horizontal scan means and the read means may be disposed on the same side with respect to the sheet, or may be disposed separately on the opposite sides across the sheet. Furthermore, two read means maybe disposed on the opposite sides across the sheet, respectively. In the case where the horizontal scan means and the read means are disposed separately on the opposite sides, or two read means are disposed on the opposite sides, a support body for the sheet needs to have a property of allowing passage of a photostimulated luminescent light beam so that the photostimulated luminescent light beam is transmitted through the bottom surface of the sheet opposite to the sheet surface on which an excitation light beam is incident.

According to the present invention, a plurality of spot-sized excitation light beams are scanned simultaneously onto a stimulable phosphor sheet at predetermined intervals on the horizontal scanning line, so the excitation light beams can be efficiently irradiated onto the sheet. This can shorten the time needed to read the radiation image information stored in the sheet. In addition, since horizontal scanning is performed with the spot-sized excitation light beams, crosstalk does not occur as it does in the case where line excitation light is irradiated onto the sheet. This makes it possible to obtain an image signal with which a high-quality radiation image without a reduction in sharpness due to crosstalk is reproducible.

In addition, in the case where a light-emitting element array with a plurality of light-emitting elements disposed in a row is employed as the excitation light source, a plurality of light-emitting element arrays are used. In this case, the nonemission portions in one light-emitting element array and the light-emitting elements in another light-emitting element array are disposed complementarily in the vertical scanning direction. Furthermore, a single excitation light beam is emitted by sequentially turning on the light-emitting elements of the light-emitting element arrays alternately. This renders it possible to irradiate an excitation light beam smoothly and continuously without being affected by the non emissive portion between the light-emitting elements of the light-emitting element array.

Furthermore, in the case where the read means comprises light-collecting means having a plurality of separate portions which respectively collect the photostimulated luminescent light beams emitted by horizontal scanning of excitation light beams, and a plurality of photoelectric conversion means, two photostimulated luminescent light beams emitted by two excitation light beams will be collected by a single separate portion, if the excitation light beam scans that portion on the sheet that corresponds to a portion near the boundary of the aforementioned separate portions. If the two photostimulated luminescent light beams are detected by one separate portion of the light-collecting means, it will cause crosstalk. Therefore, in the case where two photostimulated luminescent light beams are detected by a single separate portion during horizontal scanning of excitation light beams, horizontal scanning is performed by turning off one of the two excitation light beams so that one of the two photostimulated luminescent light beams is turned off. Thus, the occurrence of crosstalk can be prevented.

BRIEF DESCRIPTION OF THE DRAWINGS

The present invention will be described in further detail with reference to the accompanying drawings wherein:

FIG. 2 is an enlarged plan view of the line sensor shown in FIG. 1;

FIGS. 3A to 3D are diagrams showing how irradiation of excitation light beams and detection of photostimulated luminescent light beams are performed;

FIG. 4 is a detailed schematic diagram of the LED array shown in FIG. 1;

DESCRIPTION OF THE PREFERRED EMBODIMENTS

Figure 1A:
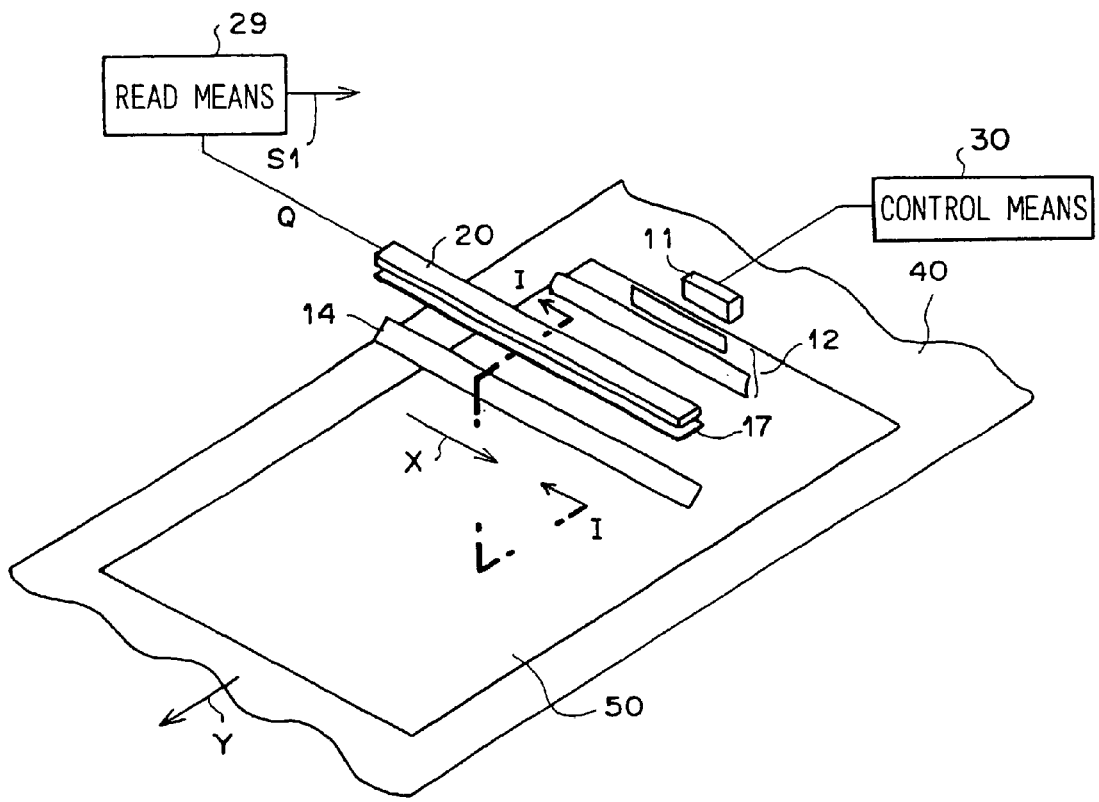
FIG. 1A is a perspective view showing a radiation image information reader constructed according to a first embodiment of the present invention.
Figure 1B:
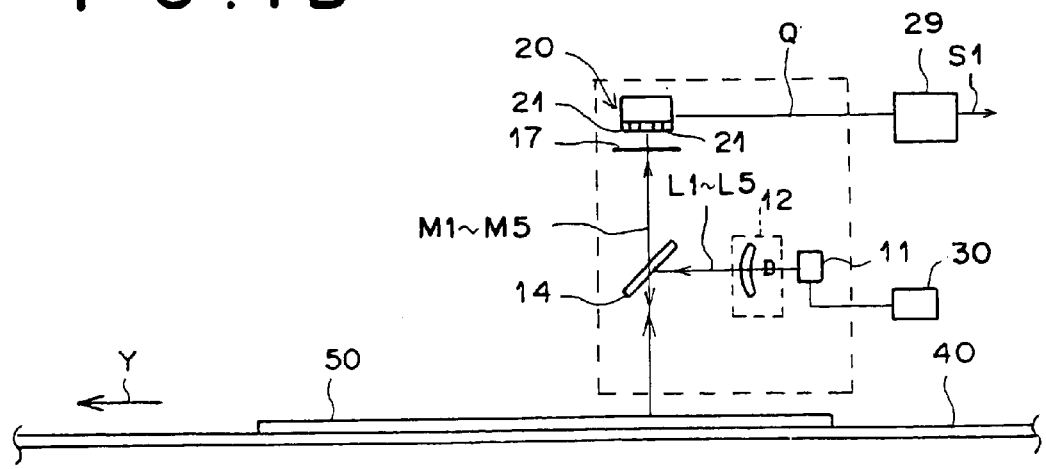
FIG. 1B is a sectional view of the radiation image information reader taken substantially along line I—I of FIG. 1A.

Referring now in greater detail to the drawings and initially to FIG. 1, there is shown a radiation image information reader in accordance with a first embodiment of the present invention. The radiation image information reader is equipped with a conveyor belt 40, a light-emitting diode (LED) array 11, and an optical system 12. The conveyor belt 40 is used for placing a stimulable phosphor sheet 50 (hereinafter referred to as a sheet) storing radiation image information, and then conveying the sheet 50 in the direction of arrow Y. The LED array 11 is used for emitting five spot-sized excitation light beams L1 to L5 toward the surface of a sheet 50 at the same time and scanning them in the direction of arrow X. The optical system 12 is constructed of a collimator lens for collimating the excitation light beams L1 to L5 emitted from the LED array 11, and a toric lens for enlarging the beams only in one direction. The radiation image information reader is also equipped with a dichroic mirror 14, an excitation-light cut filter 17, and a line sensor 20. The dichroic mirror 14 is inclined at an angle of 45 degrees to the surface of the sheet 50 so that it reflects the excitation light beams L1 to L5 and transmits photostimulated luminescent light beams M1 to M5 described later. The excitation-light cut filter 17 cuts off the excitation light beams L1 to L5, reflected at the surface of the sheet 50, and present slightly in the photostimulated luminescent light beams M1 to M5 transmitted through the dichroic mirror 14. The excitation-light cut filter 17 also allows passage of the photostimulated luminescent light beams M1 to M5. The line sensor 20 has a large number of photoelectric conversion elements 21 arrayed so that the photostimulated luminescent light beams M1 to M5 transmitted through the excitation-cut filter 17 are received and photoelectrically converted. The radiation image information reader is further equipped with read means 29 and control means 30. The read means 29 is used to obtain an image signal S representing the radiation image information stored in the sheet 50, by sequentially reading signals output from the photoelectric conversion elements 21 of the line sensor 20 in accordance with movement of the sheet 50. The control means 30 is used to control driving of the LED array 11.

The optical system 12, constructed of a collimator lens and a toric lens, is used to enlarge the excitation light beams L1 to L5 emitted from the LED array 11, to predetermined irradiation areas on the phosphor sheet 50.

The line sensor 20, as illustrated in FIG. 2, has a large number (e.g., 1000 or more) of photoelectric conversion elements 21 arrayed along the longitudinal direction, i.e., the direction of arrow X in FIG. 1. The photoelectric conversion elements 21 are arranged zigzag in a plurality of rows (e.g., five rows) in the direction of arrow Y where the sheet 50 is conveyed. Each of the photoelectric conversion elements 21 has a light-receiving surface of about 100 $\mu$m in length and about 100 $\mu$m in breadth, the surface corresponding to the spot diameter of each of the excitation light beams L1 to L5. The photoelectric conversion element 21 can employ an amorphous silicon sensor, a charge-coupled device (CCD) sensor, a metal-oxide-semiconductor (MOS) image sensor, etc.

FIGS. 3A to 3D illustrate how irradiation of the excitation light beams L1 to L5 and detection of the photostimulated luminescent light beams M1 to M5 are performed. The excitation light beams L1 to L5 emitted from the LED array 11 are shown in FIG. 3A. The excitation light beams L1 to L5 irradiated on the surface of the sheet 50 are shown in FIG. 3B. The photostimulated luminescent light beams M1 to M5 emitted from the sheet 50 by irradiation of the excitation light beams L1 to L5 are shown in FIG. 3C. The photostimulated luminescent light beams M1 to M5 irradiated to the line sensor 20 are shown in FIG. 3D.

The LED array 11 simultaneously emits five spot-sized excitation light beams L1 to L5 at regular intervals, as shown in FIG. 3A. The LED array 11 is also turned on and off by the control means 30 so that the excitation light beams L1 to L5 are scanned onto the surface of the sheet 50 in the direction of arrow X. With the control of the LED array 11 by the control means 30, the spot-sized excitation light beams L1 to L5 are scanned onto the surface of the sheet 50 in the direction of arrow X, as shown in FIG. 3B. With the scanning of the excitation light beams L1 to L5 in the direction of arrow X, photostimulated luminescent light beams M1 to M5 representing the radiation image information stored in the sheet 50 are emitted from the spots on the sheet 50 irradiated with the excitation light beams L1 to L5, as shown FIG. 3C. Since the photostimulated luminescent light beams M1 to M5 reach the line sensor 20 while enlarging, the enlarged spots of the photostimulated luminescent light beams M1 to M5 are irradiated onto the line sensor 20, as shown in FIG. 3D. Because of this enlargement, each of the photostimulated luminescent light beams M1 to M5 emitted from the spots on the sheet 50 irradiated with the excitation light beams L1 to L5 is received by a plurality of photoelectric conversion elements 21 constituting the line sensor 20. Therefore, addition of signals, emitted from the plurality of photoelectric conversion elements 21 receiving each of the photostimulated luminescent light beams M1 to M5, represents a signal value for a pixel corresponding to a position to which each of the excitation light beams L1 to L5 is irradiated.

Now, a description will be given of the operation of the image radiation information reader of the first embodiment.

Initially, the conveyor belt 40 is moved in the direction of arrow Y, whereby the sheet 50 with radiation image information placed on the conveyor belt 40 is conveyed in the direction of arrow Y.

On the other hand, the LED array 11 emits spot-sized excitation light beams L1 to L5 toward the surface of the sheet 50. The emitted excitation light beams L1 to L5 are collimated by the optical system 12 and are reflected by the dichroic mirror 14 so that they are incident on the sheet 50 in a direction normal to the sheet surface.

The excitation light beams L1 to L5 incident on the sheet 50 excite stimulable phosphors at the beam-irradiated positions. The excitation light beams L1 to L5 are also incident into the interior of the sheet 50 through the beam-irradiated positions and are diffused into portions near the beam-irradiated positions. The diffused excitation light beams L1 to L5 also excite stimulable phosphors in the portions near the beam-irradiated positions. As a result, photostimulated luminescent light beams M with a strength corresponding to the stored radiation image information are emitted from the beam-irradiated positions on the phosphor sheet 50 and the vicinities.

The photostimulated luminescent light beams M1 to M5 emitted from the sheet 50 are transmitted through the dichroic mirror 14 and focused on the light-receiving surfaces of the photoelectric conversion elements 21 of the line sensor 20. When this occurs, the excitation light beams L1 to L5, reflected at the surface of the sheet 50, and present slightly in the photostimulated luminescent light beams M1 to M5, are cut off by the excitation-light cut filter 17.

The line sensor 20 performs photoelectric conversion on the photostimulated luminescent light beams M1 to M5 received by the photoelectric conversion elements 21. Each signal Q obtained by the photoelectric conversion is input to the read means 29. The read means 29 converts the analog signal Q to a digital signal and also stores the digital signal in correlation with a position on the sheet 50. If signals Q are obtained for the whole surface of the sheet 50, the read means 29 outputs an image signal S1 representing the radiation image stored in the sheet 50 and ends processing.

Thus, according to the first embodiment, a plurality of spot-sized excitation light beams L1 to L5 are scanned simultaneously onto the stimulable phosphor sheet 50 at predetermined intervals on the horizontal scanning line, so the excitation light beams L1 to L5 can be efficiently irradiated onto the sheet 50. This can shorten the time needed to read the radiation image information stored in the sheet 50. In addition, since horizontal scanning is performed with the spot-sized excitation light beams L1 to L5, crosstalk does not occur as it does in the case where line excitation light is irradiated onto the sheet 50 with the LED array 11. This makes it possible to obtain an image signal S1 with which a high-quality radiation image without a reduction in sharpness due to crosstalk is reproducible.

Figure 5:
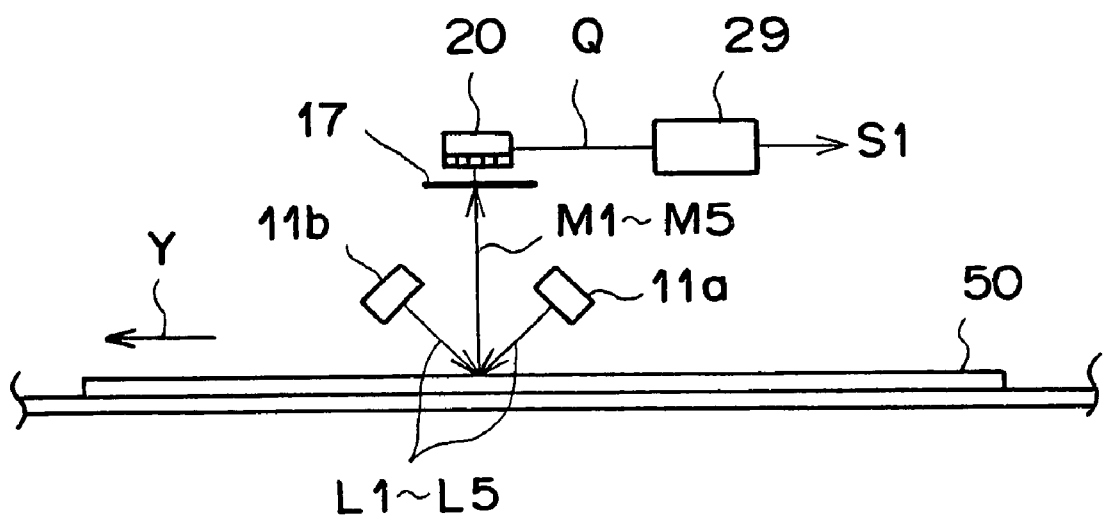
FIG. 5 is a schematic diagram of a radiation image information reader employing two LED arrays.
Figure 6:
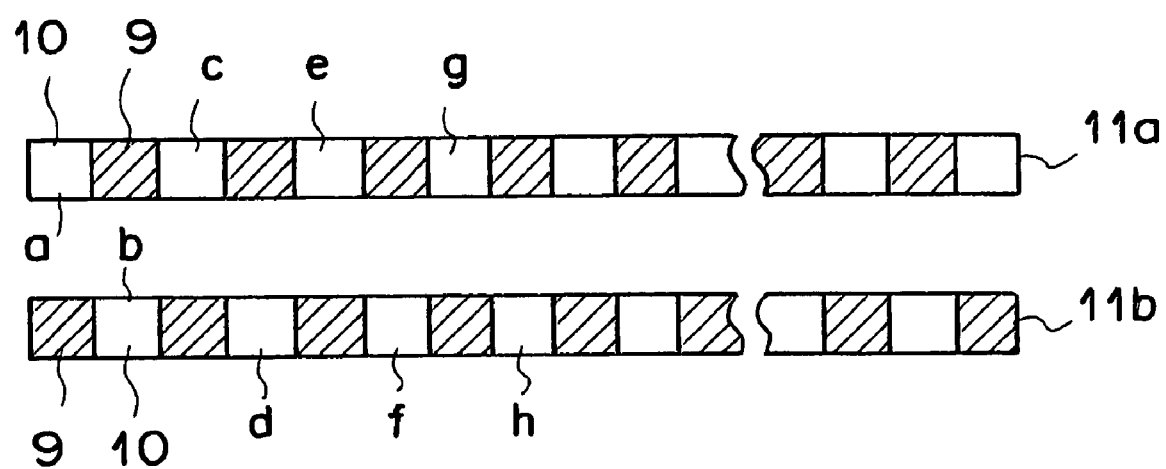
FIG. 6 is a diagram showing how the two LED arrays are disposed.

In the first embodiment, the LED array 11 from which the excitation light beams L1 to L5 are emitted has a plurality of LEDs 10 arrayed as shown in FIG. 4. Between the LEDs 10, there is interposed a non emission portion 9, which consists of a joining portion or electrode portion, for joining the LEDs 10 together. Because of the nonemission portions 9, the sheet 50 will be intermittently scanned, depending on the excitation light beams L1 to L5 emitted from the LED array 11. Therefore, it is preferable to use first and second LED arrays 11*a*, 11*b*, as shown in FIG. 5. In addition, as shown in FIG. 6, it is also preferable that the LED arrays 11*a*, 11*b* be disposed so that the non emission portion 9 of the first LED array 11*a* is aligned with the LED 10 of the second LED array 11*b* in the direction of arrow Y. In this case, between the LED arrays 11*a* and 11*b*, the LEDs 10 are turned on alternately. That is, the LEDs 10 of the LED arrays 11*a*, 11*b* in FIG. 6 are turned on in the order of a, b, c, d, e, f, g, h, etc., to emit the excitation light beams L1 to L5. This makes it possible to irradiate the excitation light beams L1 to L5 smoothly and sequentially without being affected by the nonemission portions of the LED arrays 11*a*, 11*b*.

Figure 7:
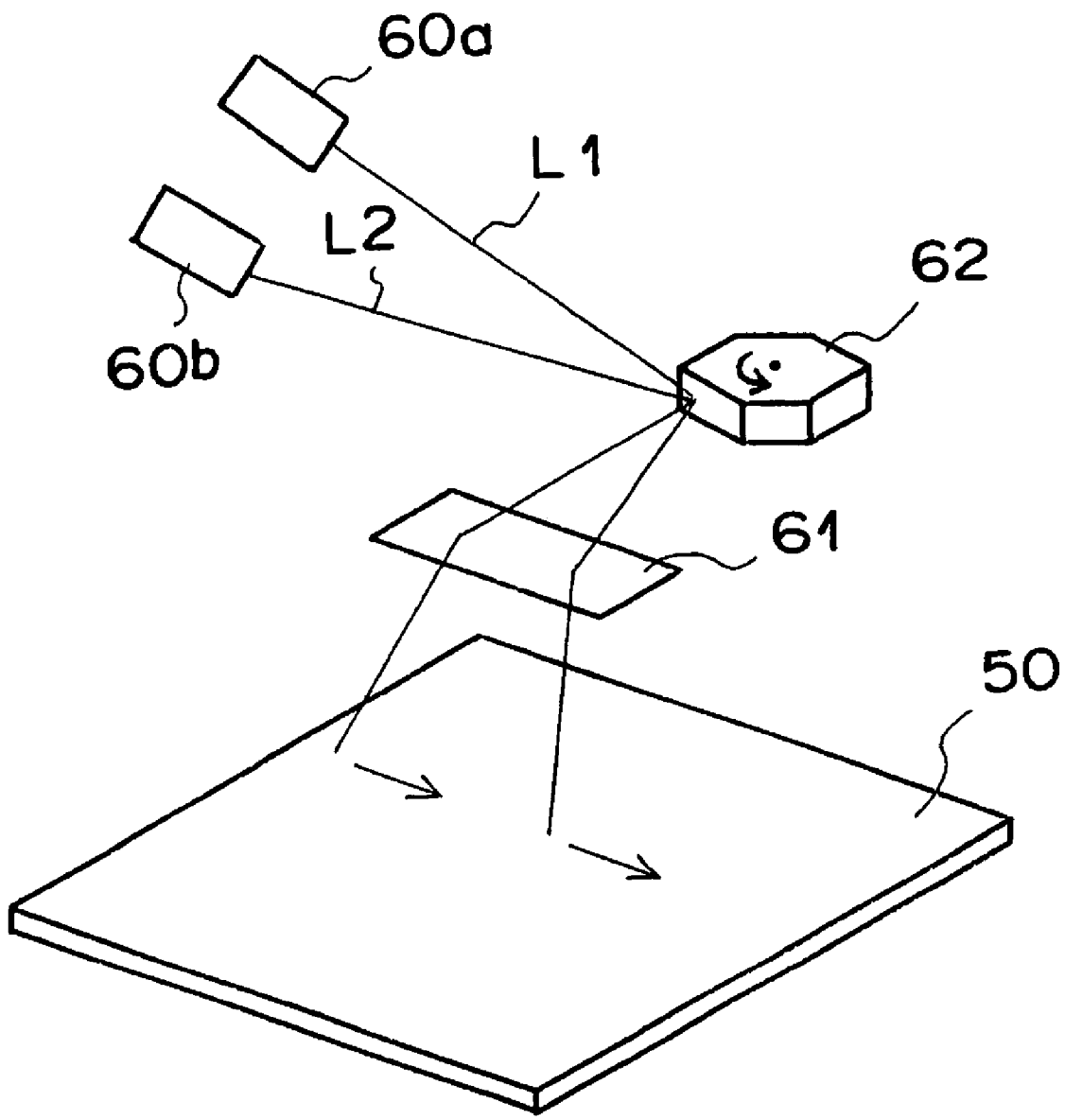
FIG. 7 is a schematic diagram of a radiation image information reader employing a plurality of laser light sources.

While, in the first embodiment, the excitation light beams L1 to L5 are irradiated onto the sheet 50 by the LED array 11, a plurality (in this embodiment, two) of laser light sources 60*a*, 60*b* such as laser diodes (hereinafter referred to as LDs) may be used. In this case, excitation light beams L1, L2 emitted from the laser light sources 60*a*, 60*b* are deflected and reflected by a rotating polygon mirror 62 so that they are scanned onto the surface of the sheet 50 in the horizontal scanning direction. Note that in FIG. 7, a mirror 61 is provided for projecting the excitation light beams L1, L2 onto the sheet 50.

Figure 8:
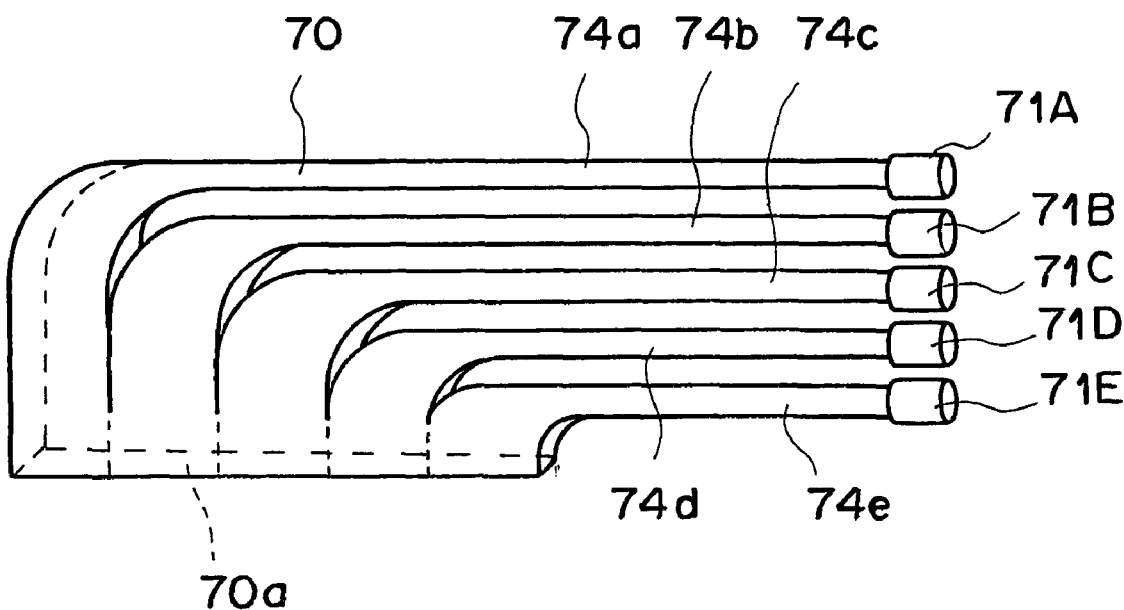
FIG. 8 is a schematic diagram of a light-collecting guide.
Figure 9:
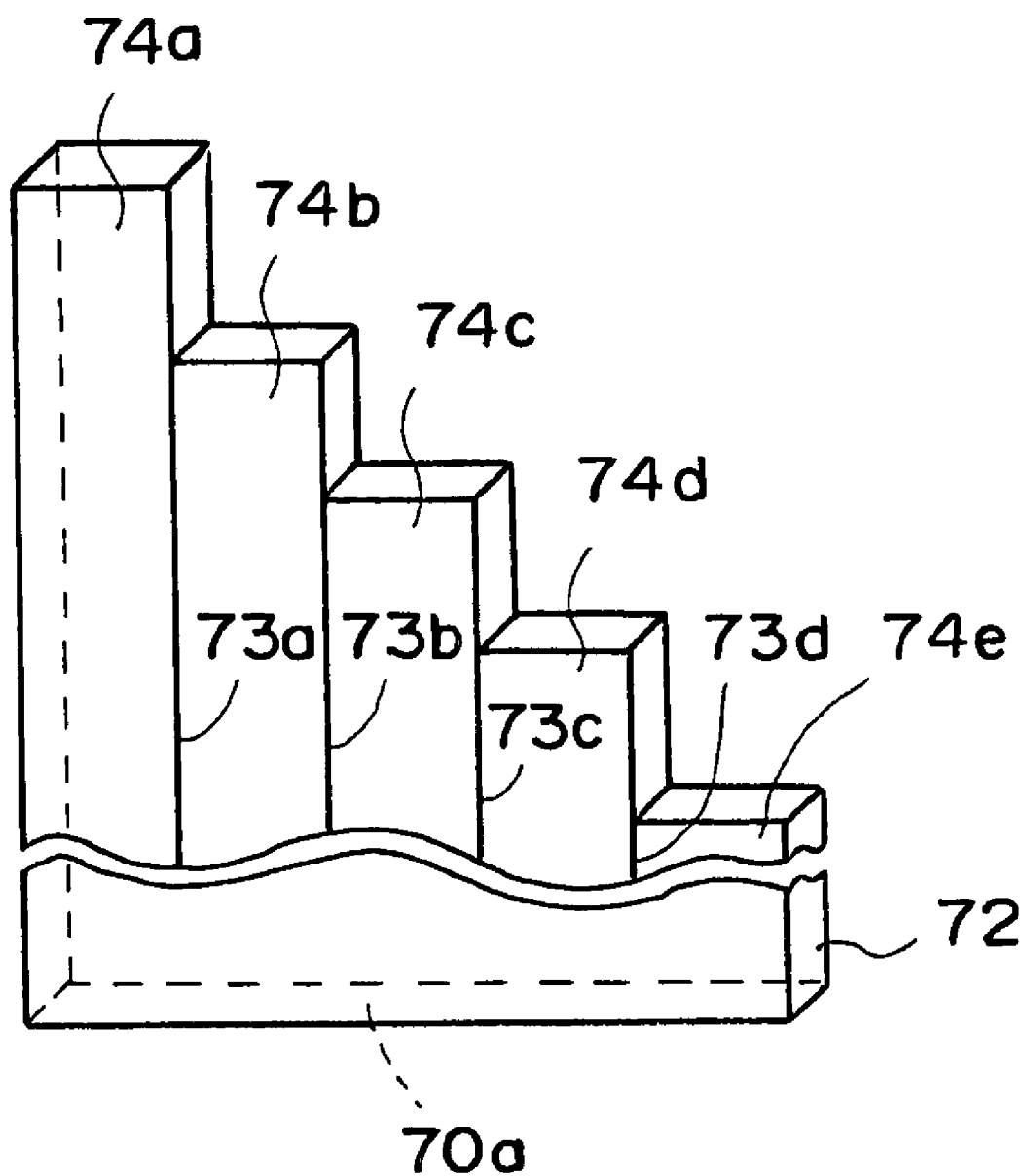
FIG. 9 is a diagram showing how the light-collecting guide is manufactured.

While the photostimulated luminescent light beams M1 to M5 in the first embodiment are detected by the line sensor 20, they may be detected by employing both a light-collecting guide 70 consisting of resin such as transparent acrylic, etc., and photomultipliers (PMTs) 71A to 71E for photoelectrically converting a photostimulated luminescent light beam, as shown in FIG. 8. The light-collecting guide 70, as shown in FIG. 9, is formed by cutting acrylic resin 72 at 73*a* to 73*d* to obtain separate portions 74*a* to 74*e* and then bending the separate portions 74*a* to 74*e* approximately parallel to an incidence surface 70*a*. Also, the end surfaces, remote from the incidence surface 70*a*, of the separate portions 74*a* to 74*e* are attached to the PMTs 71A to 74E, respectively. In the case of employing the light-collecting guide 70, the excitation light beams L1 to L5 are assumed to scan those regions on the sheet 50 which correspond to the separate portions 74*a* to 74*e* of the light-collecting guide 70, respectively. With formation of the light-collecting guide 70, the photostimulated luminescent light beams M1 to M5 incident on the incidence surface 70*a* reach the end surface of the separate portions 74*a* to 74*e* while repeating total reflection, and are detected photoelectrically by the PTMs 71A to 71E.

Figure 10:
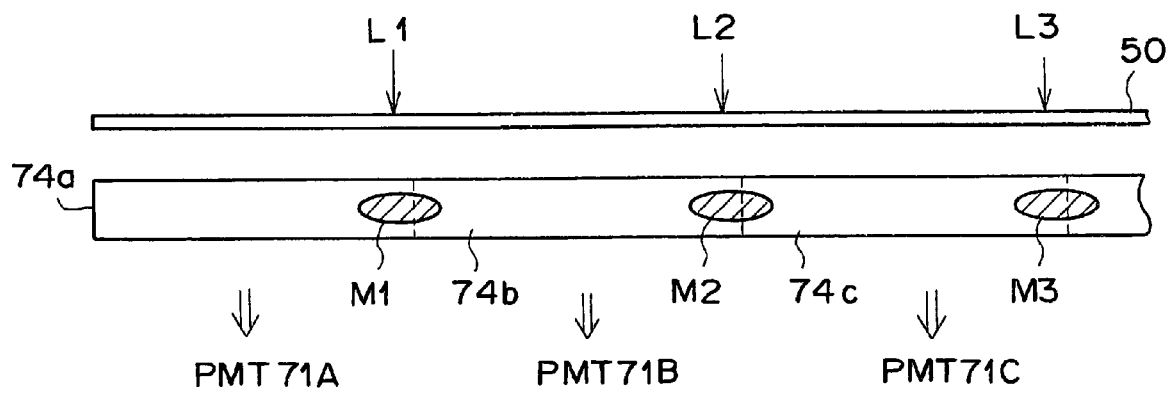
FIG. 10 is a diagram used for explaining the irradiation of an excitation light beam and the detection of a photostimulated luminescent light beam in the case of using the light-collecting guide.

In the case where the photostimulated luminescent light beams M1 to M5 are detected by the light-collecting guide 70 having the separate portions 74*a* to 74*e*, as described above, scanning of those regions on the sheet 50 which correspond to the boundaries between separate portions 74*a* to 74*e* will give rise to crosstalk. That is, when the excitation light beams L1 to L5 are scanning the regions on the sheet 50 which correspond to portions near the boundaries between separate portions 74*a* to 74*e*, the photostimulated luminescent light beams M1 to M5 emitted from the sheet 50 are collected by two separate portions and detected by the PMTs 71A to 71E. More specifically, as shown in FIG. 10, when the excitation light beams L1 to L3 are scanning those regions on the sheet 50 which correspond to portions near the boundaries between separate portions 74*a* to 74*c*, the photostimulated luminescent light beam M1 emitted from a spot irradiated with the excitation light beam L1 is collected by the separate portions 74*a*, 74*b* and detected by the PMTs 71A, 71B. The photostimulated luminescent light beam M2 emitted from a spot irradiated with the excitation light beam L2 is also collected by the separate portions 74*b*, 74*c* and detected by the PMTs 71B, 71C. Similarly, each of the photostimulated luminescent light beams M3 to M5 emitted by irradiation of the excitation light beams L3 to L5 is detected by two PMTs. Note that in FIG. 10, only the photostimulated luminescent light beams M1 to M3 emitted by irradiation of the excitation light beams L1 to L3 are shown for convenience.

Therefore, in the case where the photostimulated luminescent light beams M1 to M5 are detected with a light-collecting guide 70 such as that shown in FIG. 8, it is preferable to turn on the LED array 11 by the control means 30 in the following manner. FIG. 11 illustrates how the LED array 11 is turned on by the control means 30. In the figure, it is assumed that three excitation light beams L1 to L3 are irradiated onto the sheet 50 for convenience. It is also assumed that the excitation light beams L1 to L3 are collected by three separate portions 74a to 74c and detected by three PMTs 71A to 71C. Furthermore, the excitation light beams L1 to L3 are scanned in the direction of arrow X.

A horizontal scanning line on the sheet 50 is first divided into five sections A1 to A5, as shown in FIG. 1A. Then, the sections A1 and A2 are scanned with the excitation light beam L1, the sections A3 and A4 with the excitation light beam L2, and the section A5 with the excitation light beam L3. The section A1 is a region where the photostimulated luminescent light beam M1 emitted by the irradiation of the excitation light beam L1 onto the sheet 50 is collected only by the separate portion 74a of the light-collecting guide 70. The section A2 is a region where the photostimulated luminescent light beam M1 emitted by the irradiation of the excitation light beam L1 onto the sheet 50 is collected by the separate portions 74a, 74b of the light-collecting guide 70. The section A3 is a region where the photostimulated luminescent light beam M2 emitted by the irradiation of the excitation light beam L2 onto the sheet 50 is collected only by the separate portion 74b of the light-collecting guide 70. The section A4 is a region where the photostimulated luminescent light beam M2 emitted by the irradiation of the excitation light beam L2 onto the sheet 50 is collected by the separate portions 74b, 74c of the light-collecting guide 70. The section A5 is a region where the photostimulated luminescent light beam M3 emitted by the irradiation of the excitation light beam L3 onto the sheet 50 is collected only by the separate portion 74c of the light-collecting guide 70.

Figure 11A:
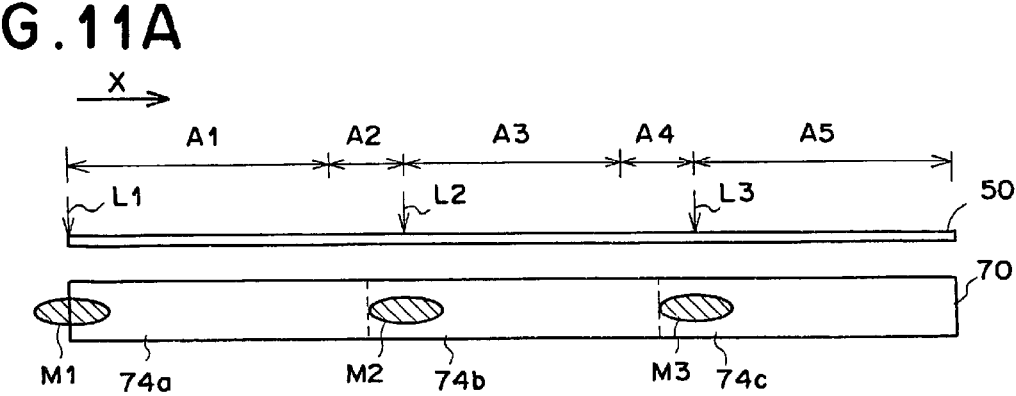
FIGS. 11A to 11F and 12 are diagrams used to explain how the LED array is turned on by control means.
Figure 11B:
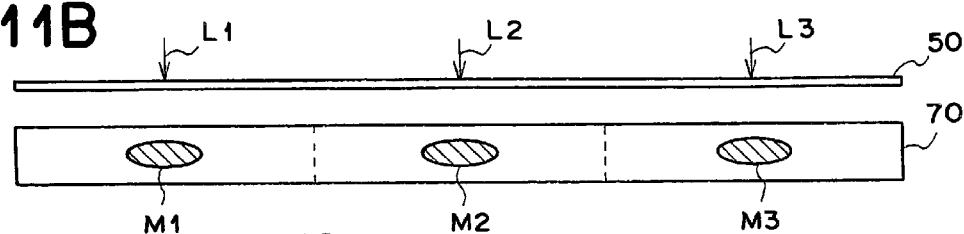
Figure 11C:
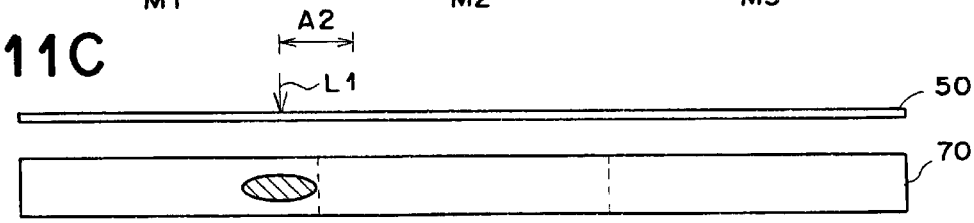

At the scan starting time shown in FIG. 11A, the excitation light beams L1 to L3 are irradiated onto the start points of the horizontal scanning. That is, the excitation light beam L1 is irradiated onto the end portion of the section A1, the excitation light beam L2 onto the boundary between the sections A2 and A3, and the excitation light beam L3 onto the boundary between the sections A4 and A5. Then, the excitation light beams L1 to L3 are scanned in the direction of arrow X, as shown in FIG. 11B. The photostimulated luminescent light beams M1 to M3 emitted from the regions on the sheet 50 irradiated with the excitation light beams L1 to L3 are respectively collected by the separate portions 74a to 74c of the light-collecting portion 70 and photoelectrically detected by the PMTs 71A to 71C. If the scanning of the sections A1, A2, and A3 by the excitation light beams L1 to L3 ends, only the excitation light beam L1 is emitted from the LED array 11, as shown in FIG. 11C. The excitation light beam L1 scans the section A2 in the horizontal scanning direction. The photostimulated luminescent light beam M1 emitted from the sheet 50 by the scanning of the section A2 is collected by the separate portions 74a, 74b of the light-collecting guide 70 and photoelectrically detected by the PMTs 71A, 71B. Thus, in the scanning of the section A2, addition of signals obtained by the PMTs 71A, 71B represents a signal value for a region irradiated with the excitation light beam L1.

Figure 11D:
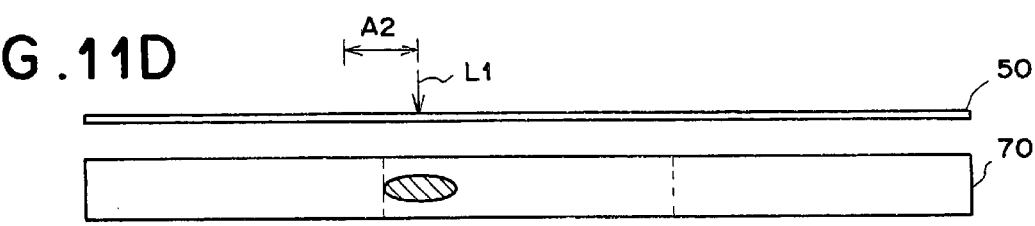
Figure 11E:
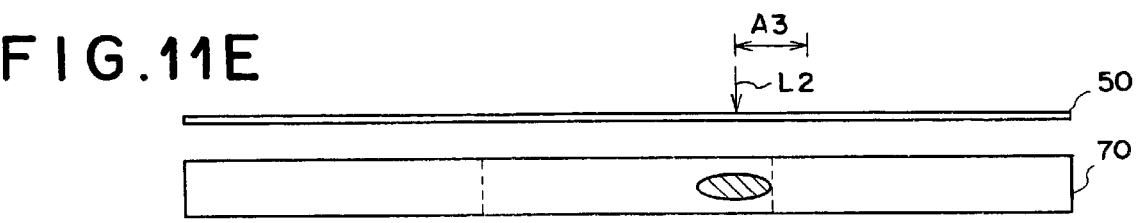
Figure 11F:
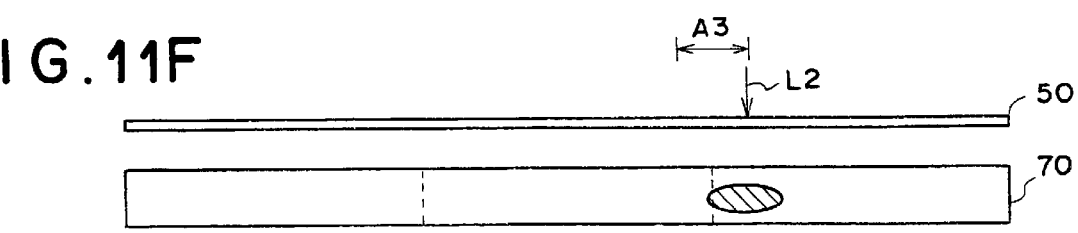

If the scanning of the section A2 ends as shown in FIG. 11D, only the excitation light beam L2 is emitted from the LED array 11, as shown in FIG. 11E. The excitation light beam L2 scans the section A4 in the horizontal scanning direction. The photostimulated luminescent light beam M2 emitted from the sheet 50 by the scanning of the section A4 is collected by the separate portions 74b, 74c of the light-collecting guide 70 and photoelectrically detected by the PMTs 71B, 71C. Thus, in the scanning of the section A4, addition of signals obtained by the PMTs 71B, 71C represents a signal value for a region irradiated with the excitation light beam L2. If the scanning of the section A4 ends as shown in FIG. 11F horizontal scanning is performed in the same manner as mentioned above. In this way, the radiation image information stored in the sheet 50 are read and the image signal S1 representing this radiation image information is obtained. Since the LED array 11 is employed as a light source for emitting the excitation light beams L1 to L3, emission of the excitation light beams L1 to L3 can be controlled easily by the control means 30.

Figure 12:
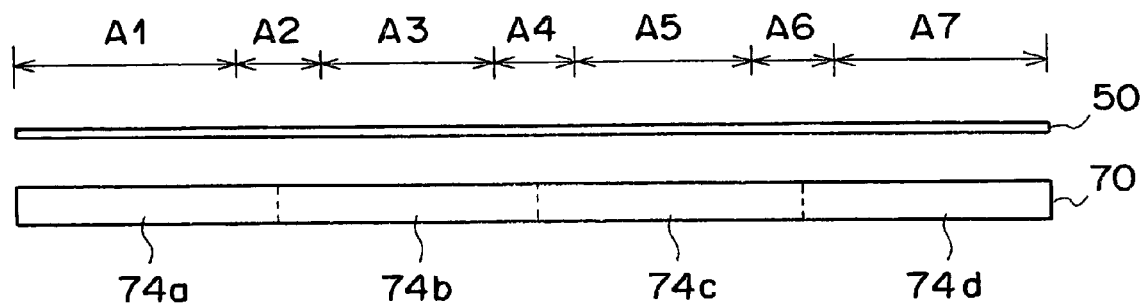

On the other hand, when the number of excitation light beams increases, for example, in the case where the sheet 50 is scanned with four excitation light beams L1 to L4, a horizontal scanning line on the sheet 50 is divided into seven sections A1 to A7, as shown in FIG. 12. The sections A1, A3, A5, and A7 are first scanned with the excitation light beams L1 to L4, respectively. Then, the section A2 is scanned with the excitation light beam L1 and the section A6 with the excitation light beam L3. After the scanning of the sections A2 and A6, the section A4 is scanned with the excitation light beam L2. In this way, reading of the radiation image information stored in the sheet 50 can be performed without giving rise to crosstalk.

Figure 13:
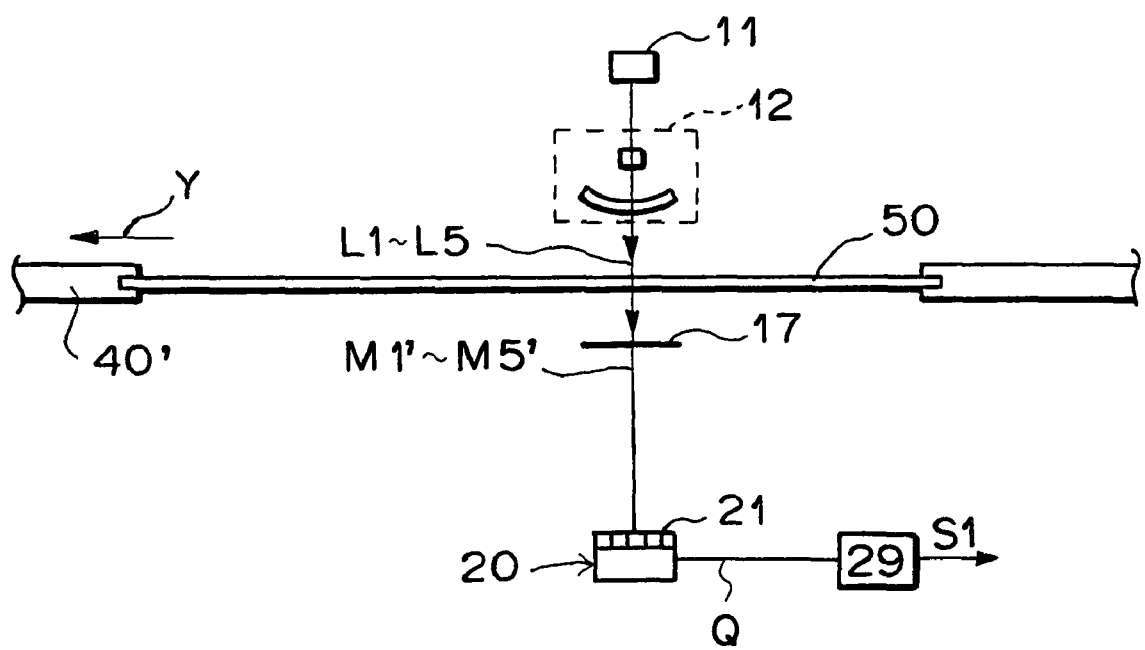
FIG. 13 is a perspective view showing a radiation image information reader constructed according to a second embodiment of the present invention.

The first embodiment, as described above, adopts a reflected-light collecting type in which the excitation light source and the line sensor are both disposed on the same side with respect to the sheet 50, and in which photostimulated luminescent light is emitted from the side on which excitation light is incident, and is received. However, the present invention is not limited to the reflected-light collecting type, but may adopt a transmitted-light collecting type by employing a stimulable phosphor sheet having a support body that allows passage of photostimulated luminescent light. This type, as shown in FIG. 13, includes an excitation light source and a line sensor, disposed on the opposite sides across the sheet. The line sensor is used to receive photostimulated luminescent light emitted from the bottom surface of the sheet opposite to the incidence surface of the sheet.

The radiation image information reader shown in FIG. 13 is equipped with a conveyor belt 40', a light-emitting diode (LED) array 11, and an optical system 12. The conveyor belt 40' is used for supporting the leading end and trailing end of a stimulable phosphor sheet 50 (the leading end and trailing end have no radiation image, or are not regions of interest even if a radiation image has been recorded), and conveying the phosphor sheet 50 in the direction of arrow Y. The LED array 11 is used for emitting five spot-sized excitation light beams L1 to L5 in a direction substantially normal to the surface of the phosphor sheet 50. The optical system 12 is constructed of a collimator lens for collimating the excitation light beams L1 to L5 emitted from the LED array 11, and a toric lens for enlarging the beams in only one direction. The optical system 12 is used for irradiating the excitation light beams L1 to L5 onto the surface of the phosphor sheet 50. The radiation image information reader is further equipped with an excitation-light cut filter 17, a line sensor 20, and read means 29. The excitation-light cut filter 17 has an optical axis substantially normal to the surface of the sheet 50. The excitation-light cut filter 17 is used to cut off the excitation light beams L1 to L5 which are present in the photostimulated luminescent light beams M1' to M5' emitted from the bottom surface of the sheet 50 (on the side opposite to the incidence surface on which the excitation light beams L1 to L5 are incident) by irradiation of the excitation light beams L1 to L5. The line sensor 20 has a large number of photoelectric conversion elements 21 and is used for receiving the photostimulated luminescent light beams M1' to M5' transmitted through the excitation-light cut filter 17 and then performing photoelectric conversion on the photostimulated luminescent light beams M1' to M5'. The read means 29 is used for reading signals Q output from the photoelectric conversion elements 21 of the line sensors 21, and obtaining an image signal S1.

Figure 14:
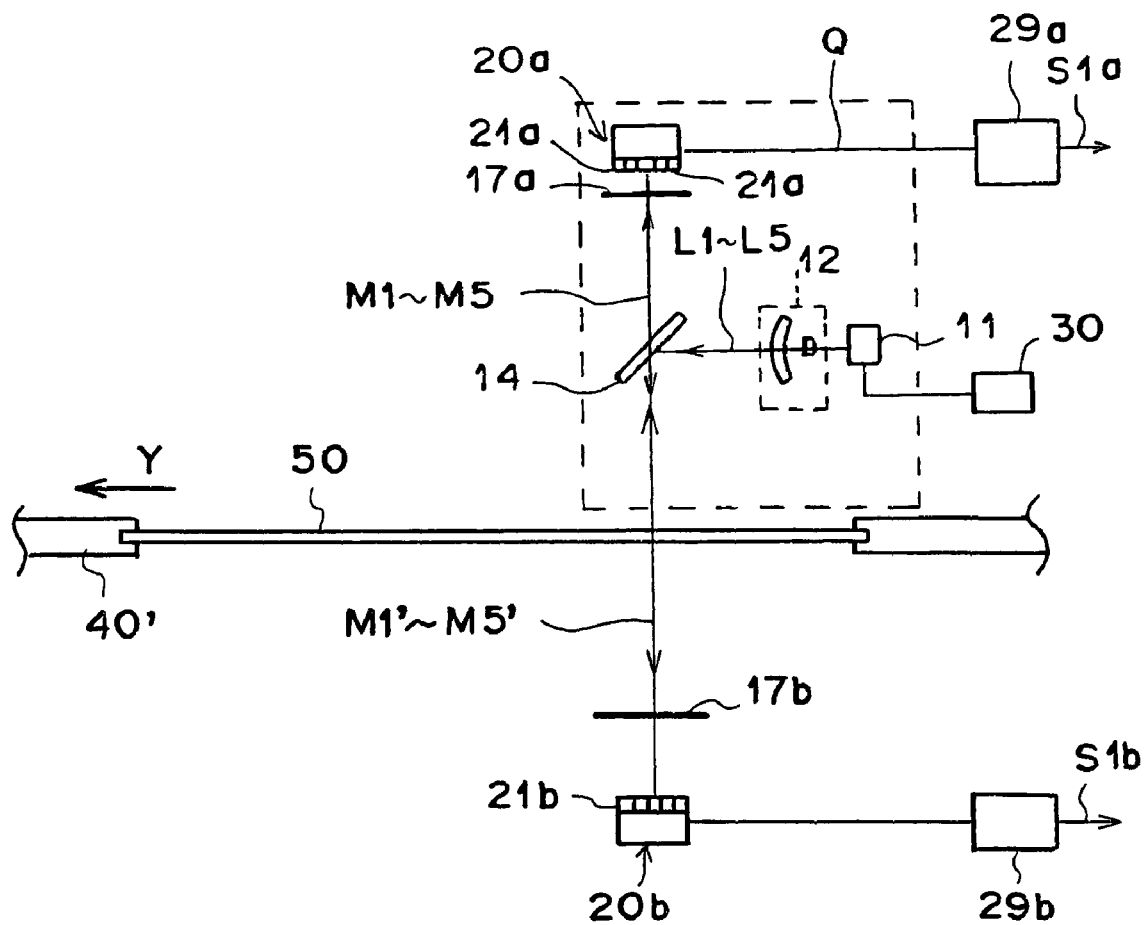
FIG. 14 is a perspective view showing a radiation image information reader constructed according to a third embodiment of the present invention.

Furthermore, the present invention can adopt a double-surface collecting type by employing a stimulable phosphor sheet having a support body that allows passage of photostimulated luminescent light. As shown in FIG. 14, in this type, two line sensors are disposed on opposite sides across the sheet so that they can receive photostimulated luminescent light beams emitted from both surfaces of the sheet.

The radiation image information reader shown in FIG. 14 is equipped with a conveyor belt 40', a light-emitting diode (LED) array 11, and an optical system 12. The conveyor belt 40' is used for supporting the leading end and trailing end of a stimulable phosphor sheet 50, and conveying the phosphor sheet 50 in the direction of arrow Y. The LED array 11 is used for simultaneously emitting five spot-sized excitation light beams L1 to L5 toward the surface of the phosphor sheet 50 and scanning the beams L1 to L5 in the direction of arrow X. The optical system 12 is constructed of a collimator lens for collimating the excitation light beams L1 to L5 emitted from the LED array 11, and a toric lens for enlarging the beams in only one direction. The radiation image information reader is also equipped with a dichroic mirror 14, an upper excitation-light cut filter 17a, and an upper line sensor 20a. The dichroic mirror 14 is inclined at an angle of 45 degrees to the surface of the sheet 50 so that it reflects the excitation light beams L1 to L5 and transmits photostimulated luminescent light beams M1 to M5 described later. The upper excitation-light cut filter 17a is used to cut off the excitation light beams L1 to L5, reflected at the top surface of the sheet 50, which are slightly present in the photostimulated luminescent light beams M1' to M5' emitted from the top surface of the sheet 50 irradiated with the excitation light beams L1 to L5. The upper line sensor 20a has a large number of photoelectric conversion elements 21a and is used for receiving the photostimulated luminescent light beams M1 to M5 transmitted through the upper excitation-light cut filter 17a and then performing photoelectric conversion on the photostimulated luminescent light beams M1 to M5. The radiation image information reader is further equipped with upper read means 29a, a lower excitation-light cut filter 17b, a lower line sensor 20b, lower read means 29b, and control means 30. The upper read means 29a is used to obtain an image signal S1a which represents radiation image information stored in the sheet 50, by sequentially reading signals output from the photoelectric conversion elements 21a of the upper line sensor 20a according to movement of the sheet 50. The lower excitation-light cut filter 17b is used to cut off the excitation light beams L1 to L5, transmitted through the sheet 50, which are slightly present in the photostimulated luminescent light beams M1' to M5' emitted from the bottom surface of the sheet 50. The lower excitation-light cut filter 17b is also used to transmit the photostimulated luminescent light beams M1' to M5' therethrough. The lower line sensor 20b has a large number of photoelectric conversion elements 21b and is used for receiving the photostimulated luminescent light beams M1' to M5' transmitted through the lower excitation-light cut filter 17b and then performing photoelectric conversion on the photostimulated luminescent light beams M1' to M5'. The lower read means 29b is used to obtain an image signal S1b which represents radiation image information stored in the sheet 50, by sequentially reading signals output from the photoelectric conversion elements 21b of the lower line sensor 20b according to movement of the sheet 50. The control means 30 is used to control driving of the LED array 11.

Finally, while the photostimulated luminescent light beams M1 to M5 are detected by either the line sensor 20 or a combination of the light-collecting guide 70 and the PMTs 71A to 71E, they may be detected by an are a sensor in which a plurality of photoelectric conversion elements are disposed in two dimensions.

What is claimed is:

1. A radiation image information reader for reading radiation image information from a stimulable phosphor sheet and obtaining an image signal which represents said radiation image information, said radiation image information reader comprising:

horizontal scan means for horizontally scanning a plurality of spot-sized excitation light beams simultaneously onto said phosphor sheet at predetermined intervals on a horizontal scanning line; and read means for obtaining said image signal which represents said radiation image information by photoelectrically detecting photostimulated luminescent light beams, emitted from portions of said sheet irradiated with said excitation light beams and/or from portions on a bottom surface of said sheet which correspond to the irradiated portions, by horizontal scanning of said excitation light beams.

2. The radiation image information reader as set forth in claim 1, wherein said horizontal scan means comprises a plurality of light-emitting element arrays in which a plurality of light-emitting elements are disposed in a row;

nonemission portions in one of said plurality of light-emitting element arrays and said light-emitting elements in another light-emitting element array are complementarily disposed in a vertical scanning direction; and said light-emitting elements in said light-emitting element arrays are sequentially turned on alternately between said light-emitting element arrays so that light emitted from said light-emitting element arrays is scanned horizontally onto said phosphor sheet as a single excitation light beam.

3. The radiation image information reader as set forth in claim 2, wherein said read means has a line sensor in which a plurality of photoelectric conversion elements are disposed in said horizontal scanning direction.

4. The radiation image information reader as set forth in claim 2, wherein said read means has an area sensor in which a plurality of photoelectric conversion elements are disposed in two dimensions.

5. The radiation image information reader as set forth in claim 2, wherein said read means comprises light-collecting means having a plurality of separate portions which respectively collect said photostimulated luminescent light beams; and a plurality of photoelectric conversion means for respectively performing photoelectric conversion on said photostimulated luminescent light beams collected by said light-collecting means.

6. The radiation image information reader as set forth in claim 5, wherein, when two photostimulated luminescent light beams emitted by irradiation of two excitation light beams are collected by one of said separate portions during horizontal scanning of said plurality of excitation light beams, one of said two excitation light beams is turned off so that one of said two photostimulated luminescent light beams is also turned off.

7. The radiation image information reader as set forth in claim 1, wherein said read means has a line sensor in which a plurality of photoelectric conversion elements are disposed in said horizontal scanning direction.

8. The radiation image information reader as set forth in claim 1, wherein said read means has an area sensor in which a plurality of photoelectric-conversion elements are disposed in two dimensions.

9. The radiation image in formation reader asset forth in claim 1, wherein said read means comprises light-collecting means having a plurality of separate portions which respectively collect said photostimulated luminescent light beams; and a plurality of photoelectric conversion means for respectively performing photoelectric conversion on said photostimulated luminescent light beams collected by said light-collecting means.

10. The radiation image information reader as set forth in claim 9, wherein, when two photostimulated luminescent light beams emitted by irradiation of two excitation light beams are collected by one of said separate portions during horizontal scanning of said plurality of excitation light beams, one of said two excitation light beams is turned off so that one of said two photostimulated luminescent light beams is also turned off.

11. A radiation image information reader for reading radiation image information from a stimulable phosphor sheet and obtaining an image signal which represents said radiation image information, said radiation image information reader comprising:

a horizontal scanner which horizontally scans a plurality of spot-sized excitation light beams simultaneously onto said phosphor sheet at predetermined intervals on a horizontal scanning line; and a detector that obtains said image signal which represents said radiation image information by photoelectrically detecting photostimulated luminescent light beams, emitted from portions of said sheet irradiated with said excitation light beams and/or from portions on a bottom surface of said sheet which correspond to the irradiated portions, by horizontal scanning of said excitation light beams.

12. The radiation image information reader as set forth in claim 11, wherein said horizontal scanner comprises a plurality of light-emitting element arrays in which a plurality of light-emitting elements are disposed in a row; and nonemission portions in one of said plurality of light-emitting element arrays and said light-emitting elements in another light-emitting element array are complementarily disposed in a vertical scanning direction; and said light-emitting elements in said light-emitting element arrays are sequentially turned on alternately between said light-emitting element arrays so that light emitted from said light-emitting element arrays is scanned horizontally onto said phosphor sheet as a single excitation light beam.

13. The radiation image information reader as set forth in claim 12, wherein said detector has a line sensor in which a plurality of photoelectric conversion elements are disposed in said horizontal scanning direction.

14. The radiation image information reader as set forth in claim 12, wherein said detector has an area sensor in which a plurality of photoelectric conversion elements are disposed in two dimensions.

15. The radiation image information reader as set forth in claim 12, wherein said detector comprises a light collector having a plurality of separate portions which respectively collect said photostimulated luminescent Light beams; and a plurality of photoelectric converters for respectively performing photoelectric conversion on said photostimulated luminescent light beams collected by said light collector.

16. The radiation image information reader as set forth in claim 15, wherein, when two photostimulated luminescent light beams emitted by irradiation of two excitation light beams are collected by one of said separate portions during horizontal scanning of said plurality of excitation light beams, one of said two excitation light beams is turned off so that one of said two photostimulated luminescent light beams is also turned off.

17. The radiation image information reader as set forth in claim 11, wherein said detector has a line sensor in which a plurality of photoelectric conversion elements are disposed in said horizontal scanning direction.

18. The radiation image information reader as set forth in claim 11, wherein said detector has an area sensor in which a plurality of photoelectric conversion elements are disposed in two dimensions.

19. The radiation image information reader as set forth in claim 11, wherein said detector comprises a light-collector having a plurality of separate portions which respectively collect said photostimulated luminescent light beams; and a plurality of photoelectric converters for respectively performing photoelectric conversion on said photostimulated luminescent light beams collected by said light-collector.

20. The radiation image information reader as set forth in claim 19, wherein, when two photostimulated luminescent light beams emitted by irradiation of two excitation light beams are collected by one of said separate portions during horizontal scanning of said plurality of excitation light beams, one of said two excitation light beams is turned off so that one of said two photostimulated luminescent light beams is also turned off.

* * * * *